(12) United States Patent
Cops et al.

(10) Patent No.: US 8,064,509 B1
(45) Date of Patent: Nov. 22, 2011

(54) ADAPTIVE EQUALIZATION BASED ON SIGNAL OVERSHOOT

(75) Inventors: Wim F. Cops, Newport Beach, CA (US); Raed Moughabghab, Laguna Niguel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 2038 days.

(21) Appl. No.: 10/987,911

(22) Filed: Nov. 12, 2004

(51) Int. Cl.
*H03H 7/30* (2006.01)

(52) U.S. Cl. ........ 375/229; 375/232; 375/233; 375/316; 375/317

(58) Field of Classification Search ............ 375/229, 375/232, 233, 316, 317; 341/155, 120, 118
See application file for complete search history.

(56) References Cited

U.S. PATENT DOCUMENTS

| | | | | |
|---|---|---|---|---|
| 5,448,589 A * | 9/1995 | McKibben | ............ | 375/230 |
| 5,483,552 A * | 1/1996 | Shimazaki et al. | ............ | 375/233 |
| 5,774,085 A * | 6/1998 | Yanagimoto et al. | ............ | 341/155 |
| 5,796,778 A * | 8/1998 | Kurker | ............ | 375/229 |
| 6,002,717 A * | 12/1999 | Gaudet | ............ | 375/232 |
| 6,188,721 B1 * | 2/2001 | Shirani et al. | ............ | 375/232 |
| 6,385,238 B1 * | 5/2002 | Nguyen | ............ | 375/232 |
| 6,880,099 B1 * | 4/2005 | Nguyen et al. | ............ | 713/502 |
| 6,975,678 B1 * | 12/2005 | Le et al. | ............ | 375/232 |
| 7,620,101 B1 * | 11/2009 | Jenkins | ............ | 375/240 |
| 2006/0098727 A1 * | 5/2006 | Kuijk | ............ | 375/232 |

* cited by examiner

*Primary Examiner* — Shuwang Liu
*Assistant Examiner* — Helene Tayong
(74) *Attorney, Agent, or Firm* — Thomas, Kayden, Horstemeyer & Risley, LLP (57) ABSTRACT

Various systems and methods are provided for adaptive equalization. The adaptive equalization is performed on a data signal received from a channel in a receiver. The data signal is equalized using an equalizer in the receiver, thereby generating an equalized data signal. During equalization, an equalization setting of the equalizer is adapted based upon an overshoot of the equalized data signal at a data transition.

22 Claims, 6 Drawing Sheets

| Status | $V_H$ | $V_L$ |
|---|---|---|
| Over Equalized | 0 | 0 |
| Optimally Equalized | 0 | 1 |
| Under-Equalized | 1 | 1 |

FIG. 6

| Equalizer Setting | Comparator Outputs | | | | | | | | | | | | | | | | | | | |
|---|---|---|---|---|---|---|---|---|---|---|---|---|---|---|---|---|---|---|---|---|
|  | LPF1 | | LPF2 | | LPF3 | | LPF4 | | LPF5 | | LPF6 | | LPF7 | | LPF8 | | LPF9 | | LPF10 | |
|  | $V_H$ | $V_L$ | $V_H$ | $V_L$ | $V_H$ | $V_L$ | $V_H$ | $V_L$ | $V_H$ | $V_L$ | $V_H$ | $V_L$ | $V_H$ | $V_L$ | $V_H$ | $V_L$ | $V_H$ | $V_L$ | $V_H$ | $V_L$ |
| ES1 | 0 | 0 | 0 | 0 | 0 | 0 | 0 | 0 | 0 | 0 | 0 | 0 | 0 | 0 | 0 | 0 | 0 | 1 | 0 | 1 |
| ES2 | 0 | 0 | 0 | 0 | 0 | 0 | 0 | 0 | 0 | 0 | 0 | 0 | 0 | 0 | 0 | 1 | 0 | 1 | 0 | 1 |
| ES3 | 0 | 0 | 0 | 0 | 0 | 0 | 0 | 0 | 0 | 0 | 0 | 0 | 0 | 1 | 0 | 1 | 0 | 1 | 0 | 1 |
| ES4 | 0 | 0 | 0 | 0 | 0 | 0 | 0 | 0 | 0 | 1 | 0 | 1 | 0 | 1 | 0 | 1 | 0 | 1 | 1 | 1 |
| ES5 | 0 | 1 | 0 | 1 | 0 | 1 | 0 | 1 | 0 | 1 | 0 | 1 | 0 | 1 | 1 | 1 | 1 | 1 | 1 | 1 |
| ES6 | 0 | 1 | 0 | 1 | 1 | 1 | 1 | 1 | 1 | 1 | 1 | 1 | 1 | 1 | 1 | 1 | 1 | 1 | 1 | 1 |
| ES7 | 0 | 1 | 0 | 1 | 1 | 1 | 1 | 1 | 1 | 1 | 1 | 1 | 1 | 1 | 1 | 1 | 1 | 1 | 1 | 1 |
| ES8 | 1 | 1 | 1 | 1 | 1 | 1 | 1 | 1 | 1 | 1 | 1 | 1 | 1 | 1 | 1 | 1 | 1 | 1 | 1 | 1 |
| ES9 | 1 | 1 | 1 | 1 | 1 | 1 | 1 | 1 | 1 | 1 | 1 | 1 | 1 | 1 | 1 | 1 | 1 | 1 | 1 | 1 |
| ••• | ••• | ••• | ••• | ••• | ••• | ••• | ••• | ••• | ••• | ••• | ••• | ••• | ••• | ••• | ••• | ••• | ••• | ••• | ••• | ••• |
| ESN | 1 | 1 | 1 | 1 | 1 | 1 | 1 | 1 | 1 | 1 | 1 | 1 | 1 | 1 | 1 | 1 | 1 | 1 | 1 | 1 |

FIG. 7

ADAPTIVE EQUALIZATION BASED ON SIGNAL OVERSHOOT

BACKGROUND

Adaptive equalization is employed in order to equalize data signals that experience distortion and intersymbol interference (ISI) due to the electrical characteristics of a channel over which the data signals are transmitted. Currently, there are many types of data signals that may be transmitted at various different bit rates and slew or edge rates. Adapting an equalizer to equalize data signals of different data rates can be a difficult task. Specifically, it is difficult to adapt an equalizer to equalize a data signal when the receiver does not know anything about the data rate or slew/edge rate of the incoming data signal due to the distortion and intersymbol interference in the data signal created by the channel.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
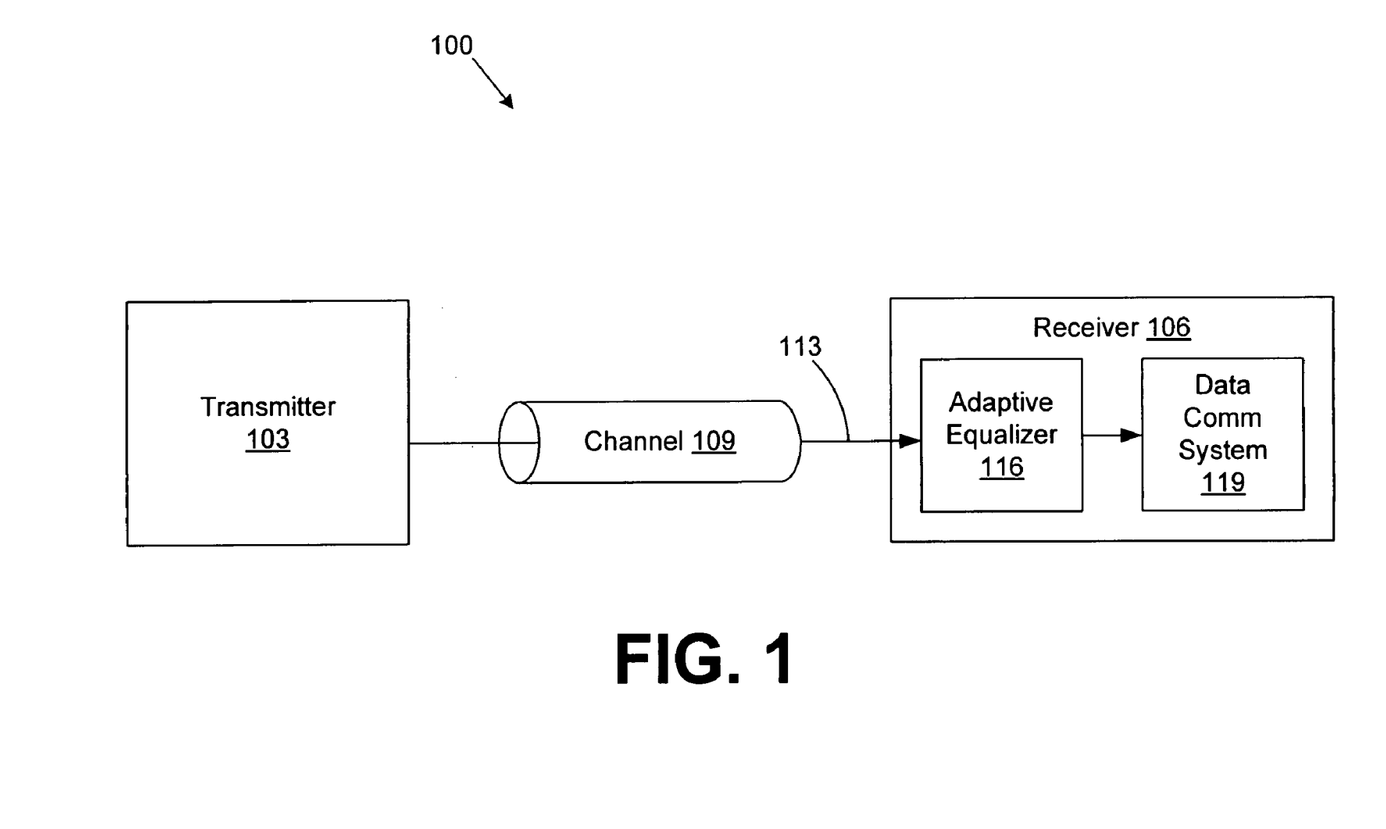
FIG. 1 is a drawing of a data communications system according to an embodiment of the present invention.

With reference to FIG. 1, shown is a block diagram of a communication system 100 according to an embodiment of the present invention. The communication system 100 includes a transmitter 103 and a receiver 106, both of which are coupled to a channel 109. The transmitter 103 and the receiver 106 may be included as a component in various data terminal equipment such as, for example, computers, facsimile machines, and any other such devices.

The transmitter 103 transmits a data signal 113 across the channel 109 to the receiver 106. The data transmitted may comprise, for example, digital information, video, audio, or any other data signal. The channel 109 may comprise, for example, wire, air, or other medium as can be appreciated. The receiver 106 receives and equalizes the data signal 113 using an adaptive equalizer 116 to eliminate distortion and inter-symbol interference (ISI) caused by the channel 109. Once the data signal 113 is reconstructed using the adaptive equalizer 116, then it is provided to the data communication system 119 in the receiver 106. In this respect, the data communication system 119 may comprise, for example, any application or physical device that receives the data and operates based upon the data itself. For example, the data communication system 119 may be a receiving portion of a facsimile device, a computer system, or other such device as can be appreciated by those with ordinary skill in the art.

The receiver 106 is "blind" as to the nature of the data signal 113 when it is first received in the adaptive equalizer 116. In this respect, the receiver 106 knows nothing about the bit rate or the slew rate/edge rate of the data signal 113. According to the various embodiments of the present invention, the adaptive equalizer 116 advantageously adapts to the data signal 113 to provide for proper equalization to correct for distortion and inter-symbol interference introduced into the data signal 113 by the channel 109 even though the receiver 106 is blind as to the basic characteristics of the data signal 113.

Figure 2:
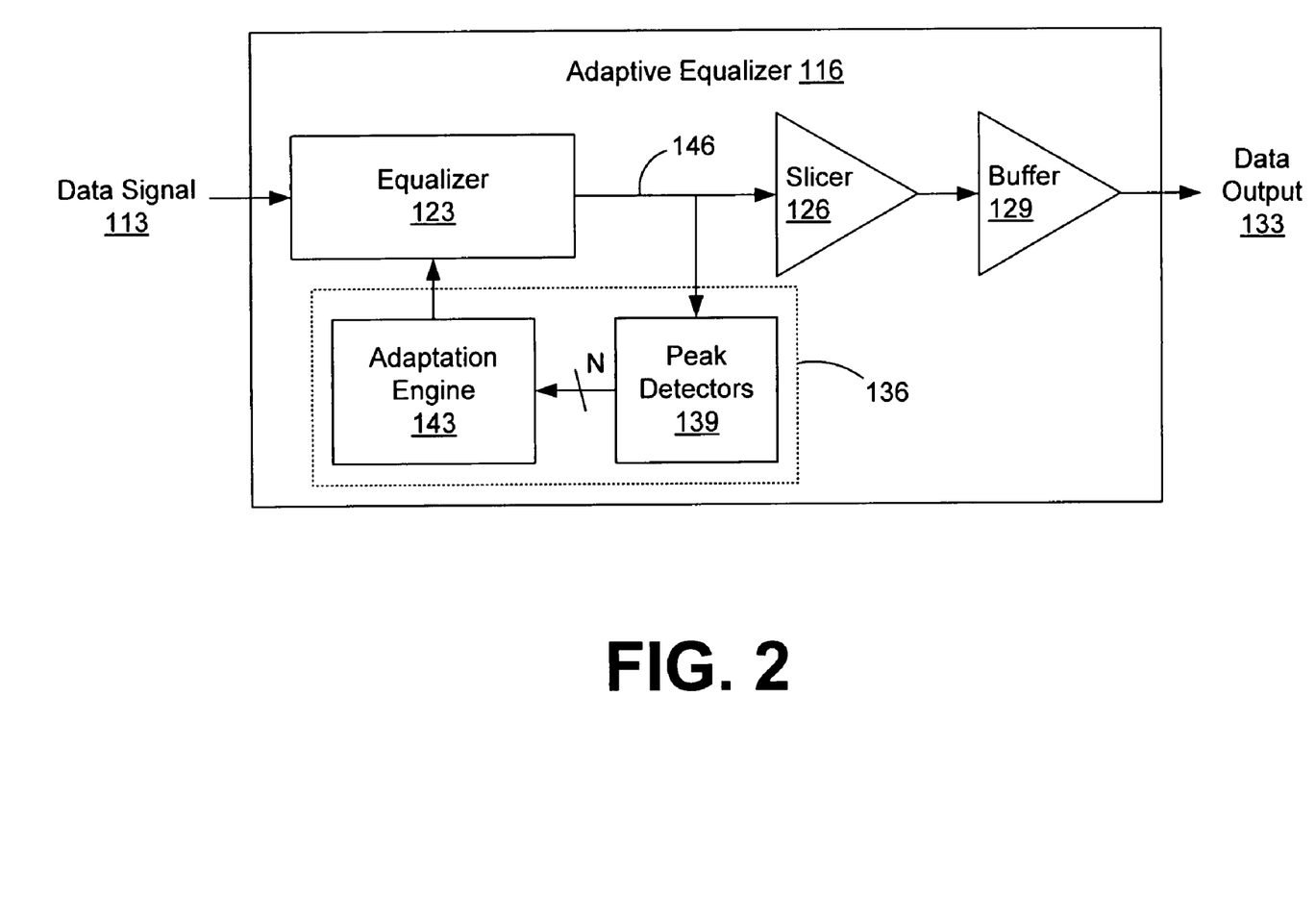
FIG. 2 is functional block diagram of an adaptive equalizer employed in a receiver in the data communications system of FIG. 1 according to an embodiment of the present invention.

Turning then to FIG. 2, shown is a block diagram that illustrates the operation of the adaptive equalizer 116 according to an embodiment of the present invention. The adaptive equalizer 116 includes an equalizer 123 that may include one or more equalization stages. In this respect, the equalizer 123 may include a number of coefficients or taps that may be adjusted to provide for greater or lesser equalization of the received data signal 113. The data signal 113 is applied to an input of the equalizer 123. The adaptive equalizer 116 also includes a slicer 126, and a buffer 129. The output of the equalizer 123 is applied to the slicer 126. The output of the slicer 126 is in turn applied to the buffer 129. The output of the buffer 129 comprises a data output 133 of the adaptive equalizer that is applied to the data communication system 119 (FIG. 1).

The adaptive equalizer 116 also includes an equalization feedback system 136. The equalization feedback system 136 includes a peak detector bank 139 and an adaptation engine 143. The output of the equalizer 123 comprises an equalized data signal 146 that is applied to the input of both the slicer 126 and the peak detector bank 139. The output of the peak detector bank 139 comprises a number of data signals that are applied to the adaptation engine 143. The data signals may comprise, for example, binary data that is employed by the adaptation engine 143 in adapting the equalizer 123 to most effectively equalize the data signal 113. In this respect, a number N of outputs of the peak detector bank 139 are applied to the adaptation engine 143 in either a parallel circuit or over a serial interface. The output of the adaptation engine 143 is applied as a feedback signal to the equalizer 123 to provide for greater or lesser equalization by the equalizer 123 acting upon the data signal 113.

Specifically, the equalizer 123 includes an equalization setting that dictates the amount of equalization that is applied to the data signal 113. The equalization setting dictates, for example, values of coefficients or other configurable parameters associated with the equalizer 123 that cause the equalizer 123 to provide for greater or lesser equalization of the data signal 113. When the equalization setting of the equalizer 123 is set at an optimal setting for a given data signal 113, then the equalized data signal 146 is substantially the same as the data signal 113 as transmitted in which all channel distortion and inter-symbol interference is minimized. In this respect, the equalization feedback system 136 adapts the equalization setting of the equalizer 123 based upon an overshoot of the equalized data signal 146 at a data transition as will be described.

Next, a discussion of the operation of the adaptive equalizer 116 is provided. To begin, a data signal 113 is applied to the equalizer 123. When the data signal 113 is initially received, the equalization setting of the equalizer 123 is set at a predefined value. This predefined value may be a default setting such as, for example, a middle setting of the range possible equalization settings, or the initial equalization setting may be the last equalization setting that was employed to equalize a previous data signal 113 received by the receiver 106, etc. The equalizer 123 acts to equalize the data signal, thereby generating the equalized data signal 146. The equalized data signal 146 is fed to the peak detector bank 139 which generates data signals or readings that indicate the general quality of the equalized data signal 146 that are then applied to the adaptation engine 143.

Initially, when the data signal 113 is received, the adaptation engine 143 makes an initial determination as to the most optimal equalization setting of the equalizer 123 for the equalization of the newly arrived data signal 113. Thereafter, the adaptation engine 143 monitors the operation of the equalizer 123 receiving the data signals from the peak detector bank 139 and making adjustments to the equalization setting during the course of the receiving of the data signal 113 if needed. By monitoring the operation of the equalizer 123, the equalization setting may be adjusted to ensure that the equalized data signal 146 is properly equalized so that the entire data signal 113 may be and properly applied as the data output 133 to the other data communication systems within the receiver 106.

It is understood that the components described in the adaptive equalizer 116 may be implemented using dedicated logic circuitry, programmable processors, or a combination of dedicated logic circuitry and programmable processors. Also, the logic or programs employed may be configurable for different equipment of environments in which the receiver 106 is employed.

Figure 3:
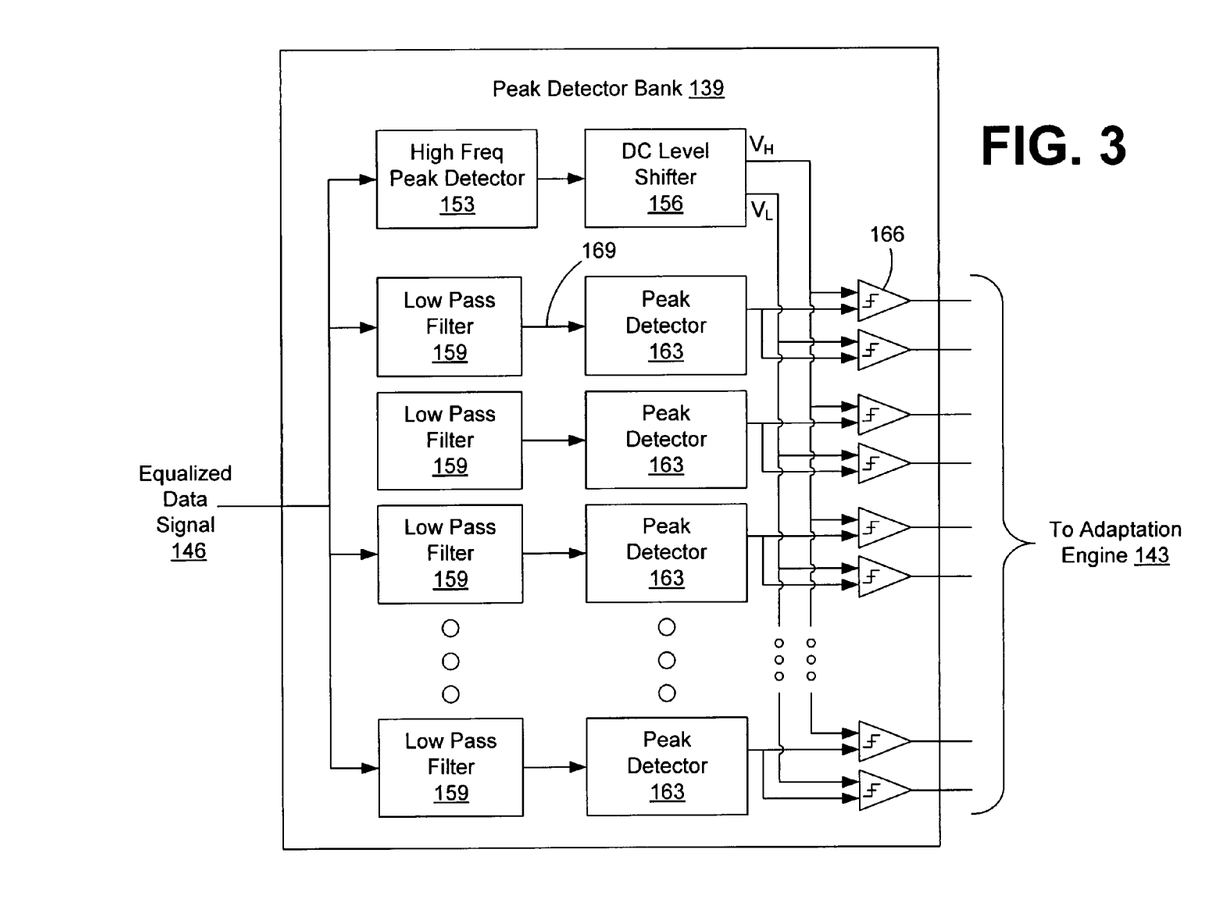
FIG. 3 is a functional block diagram of one example of a peak detector bank employed in the adaptive equalizer of FIG. 2 according to an embodiment of the present invention.

Referring next to FIG. 3, shown is an example of the peak detector bank 139 according to an embodiment of the present invention. As shown, the peak detector bank 139 includes a high frequency peak detector 153 and a DC level shifter 156. In addition, the peak detector bank 139 includes a number of low pass filters 159 and a number of peak detectors 163. Each of the peak detectors 163 corresponds with one of the low pass filters 159. There may be any number of low pass filters 159 and corresponding peak detectors 163. The equalized data signal 146 is applied to the high frequency peak detector 153 and to each one of the low pass filters 159. The output of the high frequency peak detector 153 is applied to the DC level shifter 156, and the output of each of the low pass filters 159 is applied to a corresponding one of the peak detectors 163. The output of the DC level shifter 156 includes a "high" voltage $V_H$ and a "low" voltage $V_L$. The high and low voltages $V_H$, $V_L$ are generated based upon a maximum overshoot of the data signal 113 as detected by the high frequency peak detector 153 as will be described. Also, the high and low voltages $V_H$, $V_L$ define the upper and lower limits of a magnitude range of an optimal transition for the equalized data signal as will be described.

The peak detector bank 139 also includes a number of comparators 166. The comparators are grouped in pairs. In each pair, one of the comparators 166 compares the output of a respective one of the peak detectors 163 with either the high voltage $V_H$ or the low voltage $V_L$. The outputs of the comparators 166 comprises a binary data signal that indicates whether the value provided by the peak detectors 163 is greater or less than the respective high voltage $V_H$ or low voltage $V_L$.

Each combination low pass filter 159 and peak detector 163 generates a low pass filtered peak that is applied as an input to respective comparators 166 as shown. In this respect, the comparators 166 generate two digit binary data indicating whether the low pass filtered peak generated by the respective low pass filter 159 and corresponding peak detector 163 is greater than the high voltage $V_H$, between the high voltage $V_H$ and the low voltage $V_L$, or less than the low voltage $V_L$. In this respect a position of the magnitude of the low pass filtered peaks generated by the peak detectors 163 relative to the magnitude range of an optimal transition defined between the high and low voltages $V_H$, $V_L$ can be determined.

Each of the low pass filters 159 has a cut off frequency that is unique with respect to each other. The cut off frequencies may be associated with various known bit rates of data signals 113 anticipated to be received by the adaptive equalizer 116 as part of the receiver 106 (FIG. 1). In this respect, the data signals 113 may comprise one of a number of known bit rates set forth in various data communications standards. In particular, the low pass filters 159 remove high frequency components of the equalized data signal 146, there by resulting in a low pass filtered signal 169. The resulting low pass filtered peaks generated by the peak detectors 163 are compared to a magnitude range specified by the high and low voltages $V_H$, $V_L$ that, in turn, are determined relative to a peak of maximum overshoot of the equalized data signal 146 detected by the high frequency peak detector 153. In this respect, the input of the high frequency peak detector 153 is the raw equalized data signal 146 without bandwidth limitation.

Figure 4:
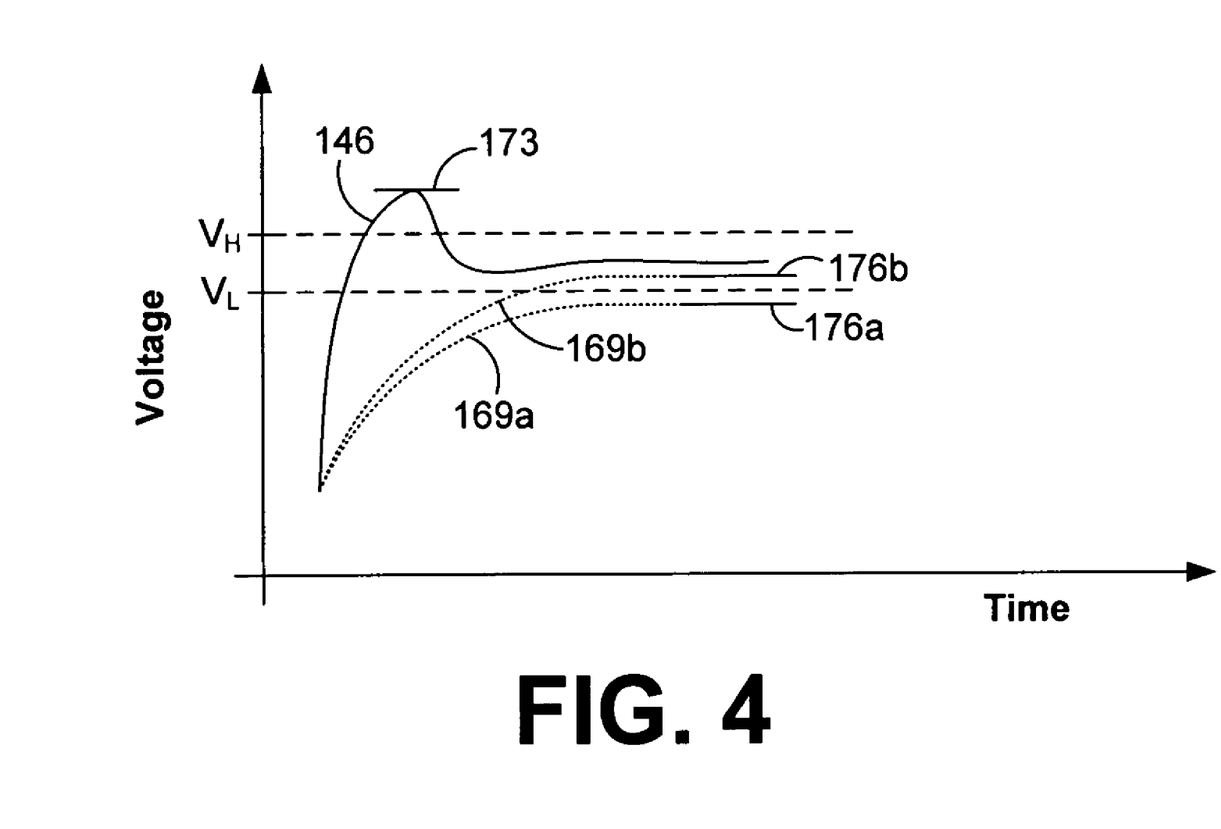
FIG. 4 is a graph that illustrates a number of examples of equalized data signals analyzed by an adaptation engine in the adaptive equalizer of FIG. 2 according to an embodiment of the present invention.

Referring next to FIG. 4, shown is a graph of voltage versus time that depicts examples of various data signals according to various embodiments of the present invention. Specifically, the graph depicts an example of the equalized data signal 146 that is applied to an input of the high frequency peak detector 153 and the low pass filters 159 as shown with reference to FIG. 3. As shown, the equalized data signal 146 rises to a peak of maximum overshoot 173 and generally levels off with a minor amount of ringing.

Also depicted are low pass filtered signals 169a and 169b. The low pass filtered signals 169a and 169b are provided as examples of many various types of low pass filtered signals 169 that may be generated by the various low pass filters 159 for a data signal 113 with the equalization setting of the equalizer 123 set at a given setting. The peak detectors 163 detect a peak associated with the low pass filtered signals 169a denoted as low pass filter peaks 176a and 176b. According to various embodiments of the present invention, the level of the peak of maximum overshoot 173 is employed to predict whether an equalization setting of the equalizer 123 (FIG. 2) is set at an optimal setting for a given data signal 113 input to the adaptive equalizer 116 (FIG. 2).

In particular, the high frequency peak detector 153 (FIG. 3) determines the magnitude of the peak of maximum overshoot 173. Once the peak of maximum overshoot 173 is known, then the high and low voltages $V_H$, $V_L$ can be determined. Specifically, the high and low voltages $V_H$, $V_L$ may be determined as being a predefined interval below the peak of maximum overshoot 173. To determine the high and low frequencies $V_H$ and $V_L$, predefined values may be subtracted from the value of the peak of maximum overshoot 173 to arrive at the high and low voltages $V_H$ and $V_L$. The magnitude of these predefined values may be determined experimentally and may be stored in appropriate registers in the DC level shifter.

Alternatively, the values may be stored using logic circuitry, analog circuitry, some other approach as can be appreciated.

In this respect, the DC level shifter 156 outputs the high and low voltages $V_H$, $V_L$ based upon the peak of maximum overshoot 173 detected by the high frequency peak detector 156. The high and low voltages $V_H$, $V_L$ are the upper and lower limits of a magnitude range of optimal transition for the given data signal 113 at a given equalization setting of the equalizer 123. Specifically, when one of the low pass filtered signals 169 rises to a low pass filtered peak 176 that falls between the high and low voltages $V_H$, $V_L$, such as is the case with low pass filtered signal 169b rising to the low pass filtered peak 176b, then the output of the comparators 166 indicates that the low pass filtered peak 176 falls between the high and low voltages $V_H$, $V_L$. When the low pass filtered peak 176 of a given low pass filtered signal 169 falls between the high and low voltages $V_H$, $V_L$, then it is deemed that the equalized data signal 146 is optimally equalized given the cutoff frequency of the respective low pass filter 159.

Similarly, when a low pass filtered peak 176 falls below the low voltage $V_L$, such as is the case with the low pass filtered signal 169a that rises to the low pass filtered peak 176a, then the output of the respective comparators 166 indicates that the low pass filtered peak 176a falls below the low voltage $V_L$. When the low pass filtered peak 176 of a given low pass filtered signal 169 falls below the low voltage $V_L$, then it is deemed that the equalized data signal 146 is over equalized given the cutoff frequency of the respective low pass filter 159. Finally, assuming that a low pass filtered peak 176 falls above the high voltage $V_H$, then the respective comparators 166 indicate that the low pass filtered peak 176 falls above the high voltage $V_H$. In such a case, it is deemed that the equalized data signal 146 is under equalized given the cutoff frequency of the respective low pass filter 159. Whether or not a low pass filtered peak 176 falls above, below, or within the magnitude range bounded by the high and low voltages $V_H$, $V_L$ may depend, for example, upon the magnitude of the bit rate of the data signal 113 relative to the cutoff frequency of the respective low pass filter 159. In this manner, the equalization feedback system 136 (FIG. 2) adapts the equalization setting of the equalizer 123 based upon an overshoot of the equalized data signal 146 at a data transition.

Figure 5:
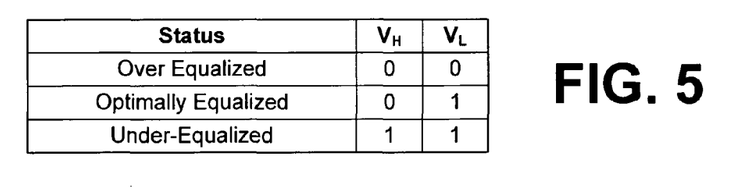
FIG. 5 is a table that illustrates an example range of possible outputs of the peak detector bank of FIG. 3 from a number of pairs of comparators in the peak detector bank of FIG. 3 according to an embodiment of the present invention.

Turning then to FIG. 5, shown is a table that depicts the potential outputs of the comparators 166 (FIG. 3) depending upon the magnitude of a given low pass filtered peak 176 relative to the magnitude range bounded by the high and low voltages $V_H$, $V_L$. In particular, for each low pass filter 159/peak detector 163 combination, one of the binary digits is output by the comparator 166 that compares the respective low pass filtered peak 176 with the high voltage $V_H$, and the second binary digit is output by the comparator 166 that compares the respective low pass filtered peak 176 with the low voltage $V_L$ as depicted with reference to FIG. 3. In particular, for example, a logical value of "0" for both comparators 166 indicates that the low pass filtered peak 176 falls below both the high and low voltages $V_H$, $V_L$. A logical value of "1" for both comparators indicates that the respective low pass filtered peak 176 falls above both the high and low voltages $V_H$, $V_L$. If the outputs of the comparators 166 are a logical value of "0" associated with the high voltage $V_H$ and a logical value of "1" with low voltage $V_L$, then the low pass filtered peak 176 falls between the high and low voltages $V_H$, $V_L$. It is understood that the logical values described above provide one approach to determining whether the low pass filtered peak 176 falls above, below, or between the high and low voltages $V_H$, $V_L$. Alternatively, many other logical circuits may be designed to perform the same function as will be appreciated by those with ordinary skill in the art.

Figure 6:
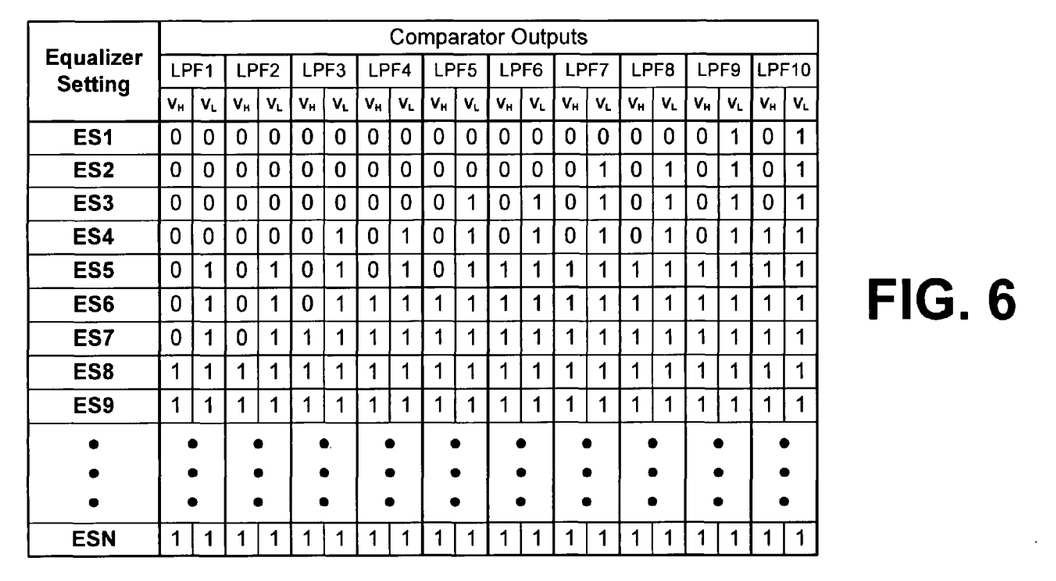
FIG. 6 is a chart that shows an example of a number of the comparator outputs with respect to various equalization settings of the equalizer in the adaptive equalizer of FIG. 2 according to an embodiment of the present invention.

With reference then to FIG. 6, shown is an example of a chart that indicates various outputs of the comparators 166 (FIG. 3) in response to the magnitude of the low pass filtered peak 176 applied there to by the respective pairs of combination low pass filters 159 and peak detectors 163 for each of a number of equalization settings of the equalizer 123 according to an embodiment of the present invention. As shown in the chart of FIG. 6, a magnitude of the low pass filtered peaks 176 are acquired for a number of low pass filters 159 and corresponding peak detectors 163 for each one of a number of equalization settings ES1 through ESN. It is understood that there may be any number of equalization settings ESN employed. The corresponding outputs from the comparators 166 generated based upon the low pass filtered peaks 176 generated by the peak detectors 163 as described above.

As shown, for the equalization setting ES4, the outputs of the comparators 166 for the respective low pass filters 159 and peak detectors 163 indicate that a maximum number of low pass filtered peaks 176 generated fall between the high and low voltages $V_H$, $V_L$. As described above, the high and low voltages $V_H$, $V_L$ were determined based upon the respective peak of maximum overshoot 173 detected by the high frequency peak detector 153 for the equalizer setting ES4. Thus, the equalization setting ES4 is an optimal equalization setting for the equalization of the data signal 113 as it is the equalization setting that results in the most low pass filtered peaks 176 that fall within the magnitude range bounded by the high and low voltages $V_H$, $V_L$. Accordingly, the adaptation engine 143 selects this optimal equalization setting to be applied to the equalizer 123 (FIG. 2) to perform equalization of the data signal 113.

According to one embodiment, when the data signal 113 is first received by the receiver 106 (FIG. 1), the adaptation engine 143 obtains the outputs of the comparators 166 for each of the low pass filters 159 and corresponding peak detectors 163 for each of the equalization settings ES1-ESN as depicted in the graph of FIG. 6. Once all of this information is obtained, then the adaptation engine 143 identifies the equalization setting ES1-ESN in which a maximum number of low pass filtered peaks 176 fall within the magnitude range bounded by the high and low voltages $V_H$, $V_L$. For purposes of convenience, as contemplated herein, the "magnitude range" is defined as the range bounded by the high and low voltages $V_H$, $V_L$. By determining the high and low voltages $V_H$, $V_L$, the magnitude range of an optimal transition for the equalized data signal 146 is determined relative to the peak of maximum overshoot 173 (FIG. 4).

Once the optimal equalization setting ESX is known, then the adaptation engine 143 continues to monitor the values received from the comparators 166 while the data signal 113 is equalized to identify if any one of the low pass filtered peaks 176 that originally fell within the magnitude range has moved outside of the magnitude range after the equalization setting of the equalizer 123 is originally set to the optimal equalization setting determined when the data signal 113 is first received.

Figure 7:
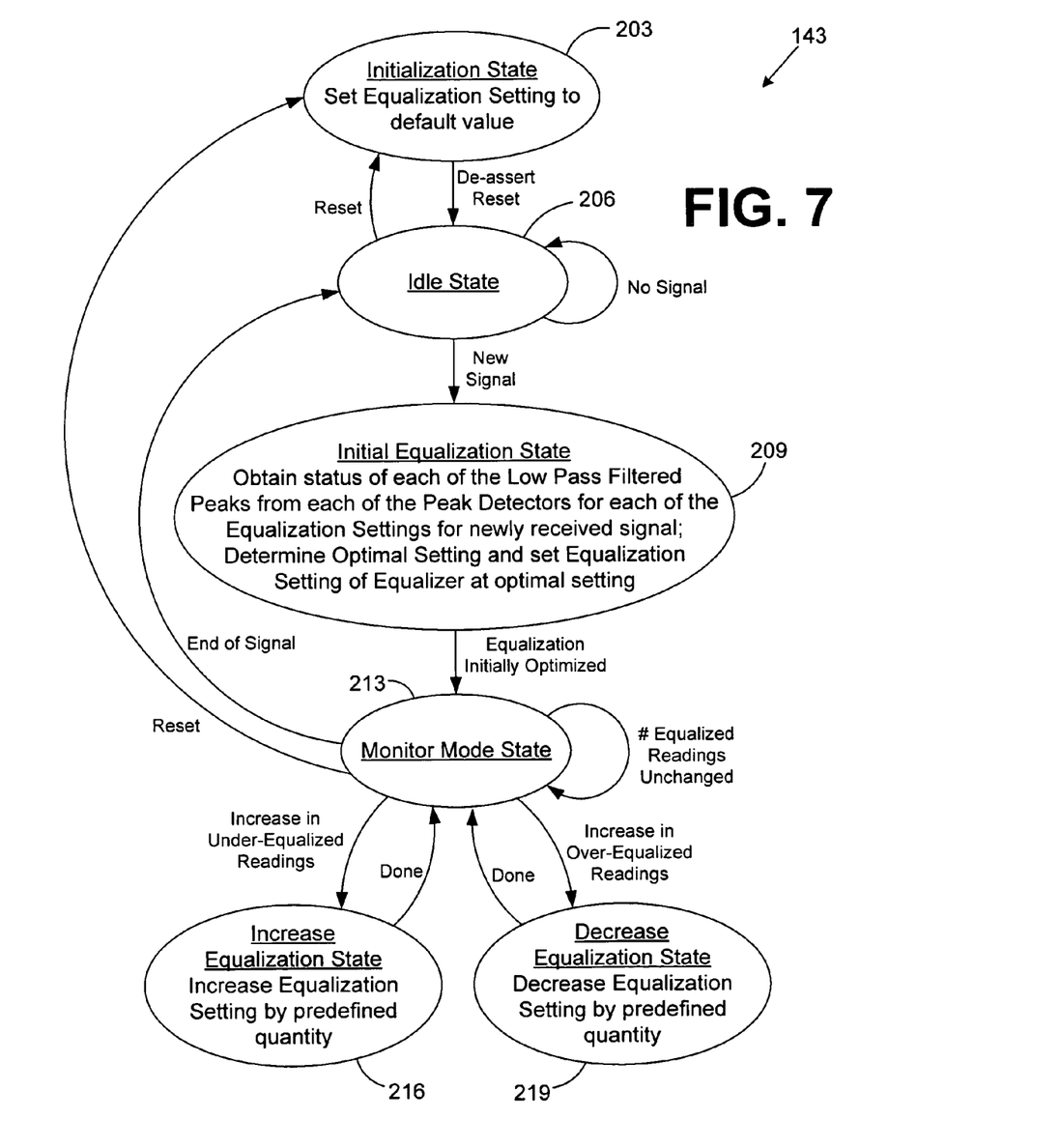
FIG. 7 is a state diagram that provides on example of the operation of the adaptation engine employed in the adaptive equalizer of FIG. 2.

Referring next to FIG. 7, shown is a state diagram of one example of the adaptation engine 143 according to an embodiment of the present invention. In this respect, the adaptation engine 143 may be implemented in terms of dedicated hardware, or by a programmable processor circuit as described above. Alternatively, the adaptation engine 143 may be implemented as a combination of dedicated or configurable hardware and a programmable processor circuit as described above.

Upon power-up or start-up, the adaptation engine 143 starts in the initialization state 203. In the initialization state 203, the equalization setting of the equalizer 123 (FIG. 2) is set to a default value. This default value may be, for example, a middle value of a range of the equalization settings that are possible for the equalizer 123 or some other setting may be designated. Assuming that the reset is de-asserted or the initialization is complete, then the adaptation engine 143 proceeds to the idle state 206 in which the adaptation engine 143 remains at an idle while no data signal 113 is being received or equalized by the equalizer 123. If in the idle state 206 a reset condition is initiated, then the adaptation engine 143 reverts back to the initialization state 203 as shown.

Assuming that a new data signal 113 is received by the receiver 106, thereby resulting in the generation of the equalized data signal 123 and the resulting outputs of the comparators from the peak detectors 139, then the adaptation engine 143 proceeds to the initial equalization state 209.

In the initial equalization state 209, each of the low pass filters 159 and corresponding peak detectors 163 provide a low pass filtered peak 176 for each of the predefined equalization settings ES1-ESN (FIG. 6). In this respect, the adaptation engine 143 consecutively sets the equalization setting of the equalizer 123 at each one of the predefined equalization settings ES1-ESN and the low pass filtered peaks 176 from each combination of the low pass filter 159 and peak detector 163 are generated. Thereafter, by examining the data output from each of the comparators 166 for each of the predefined equalization settings ES1-ESN, the adaptation engine 143 adapts the equalization setting of the equalizer 123 based upon the position of the magnitudes of the low pass filtered peaks 176 acquired for each of the equalization settings ES1-S10 relative to the corresponding magnitude range defined by the high and low voltages $V_H$, $V_L$ defined for each of the predefined equalization settings ES1-ESN.

Once all of the data for each one of the equalization settings ES1-ESN is obtained from the comparators 166, then the adaptation engine 143 identifies the optimal one of the equalization settings ES1-ESN that is to be applied to the equalizer 123. The optimal one of the equalization settings is that in which a maximum number of a low pass filtered peaks 176 fall between the high and low voltages $V_H$, $V_L$. Alternatively, the optimal one of the equalization settings may be determined based upon some other criteria given the data obtained for each of the equalization settings ES1-ESN.

Once the optimal equalization setting is applied to the equalizer 123, then the adaptation engine 143 moves to the monitor mode state 213. In the monitor mode state, the adaptation engine 143 continually reviews the outputs of the comparators 166 to determine whether any one of the low pass filtered peaks 176 indicated thereby that originally fell within the desired magnitude range has moved outside of the magnitude range, thereby indicating that the current equalization setting is no longer optimal. For example, if one or more of the low pass filtered peaks 176 moves above the high voltage $V_H$, then there is an increase in the under equalized readings as described with reference to FIG. 5 from the comparators 166 (FIG. 3), where a low pass filtered peak is deemed to be under equalized if it falls above the high voltage $V_H$.

If such is the case, then the adaptation engine 143 moves from the monitor mode state 213 to an increase equalization state 216 in which the equalization setting is increased by a predefined amount to adjust the operation of the equalizer 123 to the change in the outputs of the comparators 166. When the increase in the equalization state is completed in the increased equalization state 216, then the adaptation engine 143 moves back to the monitor mode state 213.

If while in the monitor mode state 213, one or more of the low pass filtered peaks 176 moves below the low voltage $V_L$, thereby indicating an increase in over equalized readings as set forth by the graph of FIG. 5, then the adaptation engine 143 proceeds to the decrease equalization state 219. In the decrease equalization state 219, the equalization setting of the equalizer 123 is decreased by a predefined amount. Thereafter, the adaptation engine 143 reverts back to the monitor mode state 213. Thus, in both the increase equalization state 216 and the decrease equalization state 219, the equalization setting is adjusted to optimize the equalization of the data signal 113. It may be the case that less than the original number of low pass filtered peaks 176 that fell within the magnitude range continue to fall within the range after the adjustment. In this respect, the adaptation engine 143 may continually adjust the equalization setting until it finds a new equalization setting in which a maximum number of the low pass filtered peaks 176 fall within the magnitude range.

Thus, while the total number of low pass filtered peaks 176 that originally falls in the magnitude range between the high and low voltages $V_H$, $V_L$ remains unchanged, then the adaptation engine 143 stays in the monitor mode state 213. Assuming that the end of the data signal 113 occurs, then the adaptation engine 143 moves from the monitor mode state 213 back to the idle state 206 to wait for the next data signal 113 to process. Also, assuming that a reset condition occurs in the monitor mode state 213, then the adaptation engine 143 reverts back to the initialization state as shown.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A method for adaptive equalization, comprising the steps of:
   receiving a data signal from a channel in a receiver;
   equalizing the data signal using an equalizer in the receiver, thereby generating an equalized data signal; and
   adapting an equalization setting of the equalizer based upon an overshoot of the equalized data signal at a data transition by defining a magnitude range of an optimal transition for the equalized data signal relative to a peak of a maximum overshoot of the equalized data signal;
   wherein the peak of maximum overshoot of the equalized data signal is detected by a high frequency peak detector; and
   wherein the magnitude range corresponds to a high voltage level and a low voltage level that are each below the peak of maximum overshoot by a respective predefined interval.

2. A method for adaptive equalization, comprising the steps of:
   receiving a data signal from a channel in a receiver;
   equalizing the data signal using an equalizer in the receiver, thereby generating an equalized data signal;
   adapting an equalization setting of the equalizer based upon an overshoot of the equalized data signal at a data transition by defining a magnitude range of an optimal transition for the equalized data signal relative to a peak of a maximum overshoot of the equalized data signal; and
   wherein the step of adapting the equalization setting of the equalizer based upon the overshoot of the equalized data signal at the data transition further comprises the steps of:

acquiring a magnitude of at least one low pass filtered peak of the equalized data signal for each one of a plurality of predefined equalization settings; and adapting the equalization setting of the equalizer based upon the position of the magnitude of the at least one low pass filtered peak acquired for each of the predefined equalization settings relative to the corresponding magnitude range defined for each of the predefined equalization settings.

3. The method of claim 2, wherein the magnitude of a plurality of low pass filtered peaks is acquired for each of the predefined equalization settings.

4. The method of claim 3, wherein the equalization setting is adapted based upon the position of the magnitude of the plurality of low pass filtered peaks acquired for each of the predefined equalization settings relative to the corresponding magnitude range defined for each of the predefined equalization settings, wherein each of the low pass filtered peaks is generated by a low pass filter and a corresponding peak detector, each of the low pass filters having a cutoff frequency that is unique with respect to each other.

5. The method of claim 4, wherein the step of adapting the equalization setting of the equalizer further comprises the step of identifying an optimal one of the predefined equalization settings at which a maximum number of the low pass filtered peaks fall within the magnitude range.

6. The method of claim 5, further comprising the step of setting the equalization setting of the equalizer at the optimal one of the predefined equalization settings to recover the equalized data signal.

7. The method of claim 6, further comprising the step of monitoring the low pass filtered peaks to detect whether one of the low pass filtered peaks falling within the magnitude range defined for the optimal one of the predefined equalization settings has moved outside of the magnitude range after the equalization setting of the equalizer is set at the optimal one of the predefined equalization settings.

8. The method of claim 7, further comprising the step of adjusting the equalization setting of the equalizer if the one of the low pass filtered peaks moves outside the magnitude range defined for the optimal one of the predefined equalization settings.

9. The method of claim 8, further comprising the step of increasing the equalization setting of the equalizer if the one of the low pass filtered peaks moves below the magnitude range defined for the optimal one of the predefined equalization settings.

10. The method of claim 8, further comprising the step of decreasing the equalization setting of the equalizer if the one of the low pass filtered peaks moves above the magnitude range defined for the optimal one of the predefined equalization settings.

11. An apparatus for adaptive equalization, comprising:
a receiver adapted to receive a data signal from a channel;
an equalizer in the receiver configured to equalize the data signal, thereby generating an equalized data signal;
an equalization feedback system configured to adapt an equalization setting of the equalizer based upon an overshoot of the equalized data signal at the data transition by defining a magnitude range of an optimal transition for the equalized data signal relative to a peak of a maximum overshoot of the equalized data signal;
wherein the peak of maximum overshoot of the equalized data signal is detected by a high frequency peak detector; and
wherein the magnitude range corresponds to a high voltage level and a low voltage level that are each below the peak of maximum overshoot by a respective predefined interval.

12. An apparatus for adaptive equalization, comprising:
a receiver adapted to receive a data signal from a channel;
an equalizer in the receiver configured to equalize the data signal, thereby generating an equalized data signal;
an equalization feedback system configured to adapt an equalization setting of the equalizer based upon an overshoot of the equalized data signal at the data transition by defining a magnitude range of an optimal transition for the equalized data signal relative to a peak of a maximum overshoot of the equalized data signal;
wherein the equalization feedback system further comprises at least one low pass filter and a corresponding at least one peak detector, wherein the at least one low pass filter and corresponding at least one peak detector generates a magnitude of at least one low pass filtered peak of the equalized signal for each one of a plurality of predefined equalization settings; and
the equalization feedback system being further configured to adapt the equalization setting of the equalizer based upon the position of the magnitude of the at least one low pass filtered peak acquired for each of the predefined equalization settings relative to the corresponding magnitude range defined for each of the predefined equalization settings.

13. The apparatus of claim 12, wherein the equalization feedback system further comprises a plurality of low pass filters and a plurality of corresponding peak detectors, the low pass filters and corresponding peak detectors generating a plurality of magnitudes of a corresponding plurality of low pass filtered peaks for each of the predefined equalization settings.

14. The apparatus of claim 13, wherein the equalization feedback system is further configured to adapt the equalization setting based upon the position of the magnitude of the plurality of low pass filtered peaks generated for each of the predefined equalization settings relative to the corresponding magnitude range defined for each of the predefined equalization settings.

15. The apparatus of claim 14, wherein the equalization feedback system is further configured to identify an optimal one of the predefined equalization settings at which a maximum number of the low pass filtered peaks fall within the magnitude range.

16. The apparatus of claim 15, wherein the equalization feedback system is further configured to set the equalization setting of the equalizer at the optimal one of the predefined equalization settings to recover the equalized data signal.

17. The apparatus of claim 16, wherein the equalization feedback system is further configured to monitor the low pass filtered peaks to detect whether one of the low pass filtered peaks falling within the magnitude range defined for the optimal one of the predefined equalization settings has moved outside of the magnitude range after the equalization setting of the equalizer is set at the optimal one of the predefined equalization settings.

18. The apparatus of claim 17, wherein the equalization feedback system is further configured to adjust the equalization setting of the equalizer if the one of the low pass filtered peaks moves outside the magnitude range defined for the optimal one of the predefined equalization settings.

19. The apparatus of claim 18, wherein the equalization feedback system is further configured to increase the equalization setting of the equalizer if the one of the low pass filtered peaks moves below the magnitude range defined for the optimal one of the predefined equalization settings.

20. The apparatus of claim 18, wherein the equalization feedback system is further configured to decrease the equalization setting of the equalizer if the one of the low pass filtered peaks moves above the magnitude range defined for the optimal one of the predefined equalization settings.

21. An apparatus method for adaptive equalization, comprising:
   a receiver adapted to receive a data signal from a channel;
   an equalizer in the receiver configured to equalize the data signal, thereby generating an equalized data signal;
   means for adapting an equalization setting of the equalizer based upon an overshoot of the equalized data signal at a data transition by defining a magnitude range of an optimal transition for the equalized data signal relative to a peak of a maximum overshoot of the equalized data signal;
   wherein the peak of maximum overshoot of the equalized data signal is detected by a high frequency peak detector; and
   wherein the magnitude range corresponds to a high voltage level and a low voltage level that are each below the peak of maximum overshoot by a respective predefined interval.

22. An apparatus method for adaptive equalization, comprising:
   a receiver adapted to receive a data signal from a channel;
   an equalizer in the receiver configured to equalize the data signal, thereby generating an equalized data signal;
   means for adapting an equalization setting of the equalizer based upon an overshoot of the equalized data signal at a data transition by defining a magnitude range of an optimal transition for the equalized data signal relative to a peak of a maximum overshoot of the equalized data signal; and
   wherein the means for adapting the equalization setting of the equalizer based upon the overshoot of the equalized data signal at the data transition further comprises:
   means for acquiring a magnitude of at least one low pass filtered peak of the equalized data signal for each one of a plurality of predefined equalization settings; and
   means for adapting the equalization setting of the equalizer based upon the position of the magnitude of the at least one low pass filtered peak acquired for each of the predefined equalization settings relative to the corresponding magnitude range defined for each of the predefined equalization settings.

* * * * *